United States Patent
Kurihara (10) Patent No.: US 9,308,942 B2
(45) Date of Patent: Apr. 12, 2016

(54) COWL COVER DEVICE

(71) Applicant: NIHON PLAST CO., LTD., Fujinomiya-shi, Shizuoka (JP)

(72) Inventor: Katsumi Kurihara, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/716,970

(22) Filed: May 20, 2015

(65) Prior Publication Data

US 2015/0336620 A1 Nov. 26, 2015

(30) Foreign Application Priority Data

May 21, 2014 (JP) .................................. 2014-105637

(51) Int. Cl.
*B62D 25/08* (2006.01)
*B62D 27/02* (2006.01)
*B60R 13/07* (2006.01)

(52) U.S. Cl.
CPC .............. *B62D 25/081* (2013.01); *B60R 13/07* (2013.01); *B62D 27/02* (2013.01)

(58) Field of Classification Search
CPC .................................. B60J 1/02; B62D 25/081
USPC ........................................................ 296/192
See application file for complete search history.

(56) References Cited

U.S. PATENT DOCUMENTS

| 8,757,706 B2 * | 6/2014 | Sasaki .................. B62D 25/081 296/192 |
| 2015/0091332 A1 * | 4/2015 | Kurata .................. B62D 25/081 296/192 |

FOREIGN PATENT DOCUMENTS

| JP | 2003-532574 A | 11/2003 |
| JP | 2013-501672 A | 1/2013 |
| JP | 2013-086720 A | 5/2013 |

* cited by examiner

*Primary Examiner* — Dennis H Pedder
(74) *Attorney, Agent, or Firm* — Mots Law, PLLC (57) ABSTRACT

A cowl cover includes a cover body covering a cowl part between a windshield and a vehicle body member, a locking claw protruding from a back face side of the cover body and having a claw on a first side surface of the locking claw, and an insertion portion provided along the locking claw on a second surface of the locking claw opposite from the first side surface. An engagement member is attached to an edge of the windshield and has an engagement receiver for the locking claw and a part of the insertion portion to be inserted. The engagement receiver includes a first edge to be engaged with the claw of the locking claw inserted into the engagement receiver, and a second edge facing the first edge and to be in contact with the part of the insertion portion inserted into the engagement receiver.

4 Claims, 6 Drawing Sheets

COWL COVER DEVICE

CROSS REFERENCE TO RELATED APPLICATION

This application is based upon and claims the benefit of priority from the prior Japanese Patent Application No. 2014-105637, filed on May 21, 2014, the entire contents of which are incorporated herein by reference.

BACKGROUND

1. Technical Field

The present invention relates to a cowl cover device, which includes a cowl cover, and a receiving member attached to an edge of a windshield and configured to lock the cowl cover.

2. Related Art

Published Japanese Translation of PCT International Application No. 2003-532574 (pp. 10-11, FIGS. 1-2), Japanese Patent Application Publication No. 2013-86720 (pp. 4-7, FIG. 1), and Published Japanese Translation of PCT International Application No. 2013-501672 (pp. 6-7, FIG. 2) describe cowl cover devices, respectively. These cowl cover devices apply a cowl top cover which is disposed at a so-called cowl part located between a front end part of a front windshield of an automobile and a rear side part of a hood thereof, and is designed to improve external appearance of the automobile by covering the cowl part. Moreover, a receiving member (a holder) is attached to the front end part of the front windshield while a locking claw is provided in a protruding manner in the vicinity of a rear end part of the cowl top cover. As the locking claw is inserted into the receiving member, the cowl top cover is arranged in parallel to the front windshield. This layout does not cause the cowl top cover to overlap the front windshield surface, and thus achieves a structure in which a difference in level between the cowl top cover and the front windshield surface is reduced or eliminated (made flush). Moreover, an elastically deformable sealing member is attached to a position opposed to the hood and the sealing member comes into close contact with a lower surface at a rear end of the hood in a closed state, thereby blocking hot air and odor emitted from an engine room. With the above-described configuration, the cowl cover device has advantages that it can achieve good appearance (a flush surface design effect), an aerodynamic effect, and so forth.

SUMMARY

In the meantime, according to the cowl cover device described in Published Japanese Translation of PCT International Application No. 2003-532574, the receiving member is formed by extrusion molding. For this reason, the coil cover device needs a structure for curbing a backlash in the state where the cowl top cover and the receiving member are attached thereto, and also requires jigs for determining the number of processes and shapes until the forms of the cowl top cover and the receiving member are determined. Thus, it is not easy to establish initial coordination. In addition, the locking claw therein has a so-called double-claw shape provided with two claws respectively protruding forward and backward, which increases complexity of molds for forming the locking claw and also imposes restrictions on design of the cowl top cover.

On the other hand, the cowl cover devices described in Japanese Patent Application Publication No. 2013-86720 and Published Japanese Translation of PCT International Application No. 2013-501672 each include the locking claw having a single-claw shape by causing a claw to protrude to only one side. Although this locking claw can improve productivity, there remains a demand for a technique that can more securely lock the cowl top cover with the receiving member.

An object of the present invention is to provide a cowl cover device capable of stably locking a cowl cover with a receiving member while simplifying a shape of a locking claw.

A cowl cover device in accordance with some embodiments includes: a cowl cover including a cover body covering a cowl part between a windshield and a vehicle body member, a locking claw protruding from a back face side of the cover body and having a claw on a first side surface of the locking claw, and an insertion portion provided along the locking claw on a second surface of the locking claw opposite from the first side surface; and an engagement member attached to an edge of the windshield and having an engagement receiver for the locking claw and a part of the insertion portion to be inserted. The engagement receiver includes a first edge to be engaged with the claw of the locking claw inserted into the engagement receiver, and a second edge facing the first edge and to be in contact with the part of the insertion portion inserted into the engagement receiver.

According to the above-described configuration, the claw is provided on the first side surface of the locking claw protruding from the back face side of the cover body of the cowl cover. For this reason, it is possible to bring a part of the insertion portion provided on the second side surface of the locking claw and along the locking claw into contact with the second edge of the engagement receiver of the engagement member, and to retain a state of securely engaging the claw of the locking claw with the first edge. Thus, the cowl cover can be stably locked with the engagement member.

The engagement member may include an elastically deformable elastic portion sandwiched between the edge of the windshield and the cowl cover. The cowl cover may include a recess located at a position opposed to the edge of the windshield and spacing the elastic portion from the locking claw inserted into the engagement receiver.

According to the above-described configuration, a gap between the edge of the windshield and the cowl cover can be effectively filled by elastic deformation of the elastic member. Moreover, it is possible to suppress sliding resistance between the cowl cover and the elastic portion when the locking claw is inserted into the engagement receiver by using the recess, and thus to insert the locking claw into the engagement receiver more easily.

The cowl cover may include a notch provided to the cover body at least at a base end of the locking claw.

According to the above-describe configuration, the base end of the locking claw can be formed into a weak part by using the notch. As a consequence, the locking claw is allowed to be folded at the base end when a load is applied to the cowl cover, and is therefore capable of reliably absorbing the load.

The engagement member may include a gutter protruding from a back face side of the engagement receiver and guiding water entering through the engagement receiver in a vehicle width direction.

According to the above-described configuration, the water entering through the engagement receiver is guided in the vehicle width direction by using the gutter. Thus, it is possible to more reliably inhibit the water from entering undesired parts. In addition, when the load is applied to the cowl cover, a tip end of the locking claw comes into contact with the gutter, so that a stress is more likely to be concentrated on the base end of the locking claw. Hence, the locking claw can more reliably absorb the load by being easily folded at its base end.

The cowl cover device may further include a sealing member filling a gap between the gutter and the vehicle body member.

According to the above-described configuration, the gap between the gutter and the vehicle body member is filled with the sealing member. Thus, it is possible to more reliably inhibit the water from entering undesired parts.

DETAILED DESCRIPTION

A cowl cover device according to an embodiment of the present invention will be described below with reference to the accompanying drawings.

A cowl cover device 30 according to a first embodiment will be described with reference to FIG. 1 to FIG. 6. As shown in FIG. 1 to FIG. 6, the cowl cover device 30 including a cowl top cover 16 as a cowl cover is provided to a vehicle body 10 of an automobile as a vehicle. The cowl top cover 16 covers a cowl part 15, which is located between a hood 12 as a companion member that covers an engine room 11, and a front windshield 14 as a windshield located on a front side of a vehicle cabin 13 of the vehicle body 10. Note that in the following descriptions, front-back, upper-lower, right-left, and other directions are explained on the basis of a traveling direction of the vehicle body 10. Specifically, a direction indicated with an arrow F means forward, a direction indicated with an arrow U means forward, and a direction indicated with an arrow W means a lateral direction (a vehicle width direction).

The cowl part 15 is also referred to as an air box and the like. The cowl part 15 is formed into a gutter shape with its upper side open, by using a cowl top panel 22 as a vehicle body member made of a steel plate, for example. An air intake part of a not-illustrated air-conditioner configured to take outside air into the vehicle cabin 13 is connected to the cowl part 15. Meanwhile, a motor or the like to drive wiper arms of wipers, which are not illustrated, is disposed on the right side of the cowl part 15.

The hood 12 is a hood located at a front part of the vehicle body 10 and designed to openably and closably cover the engine room 11. The hood 12 includes a hood outer part located on the outside or on an upper side in a closed state, and a hood inner part located inside or on a lower side, in the closed state, of the hood outer part while providing a little clearance in between. The hood outer part and the hood inner part are formed either integrally with or separately from each other.

Figure 1:
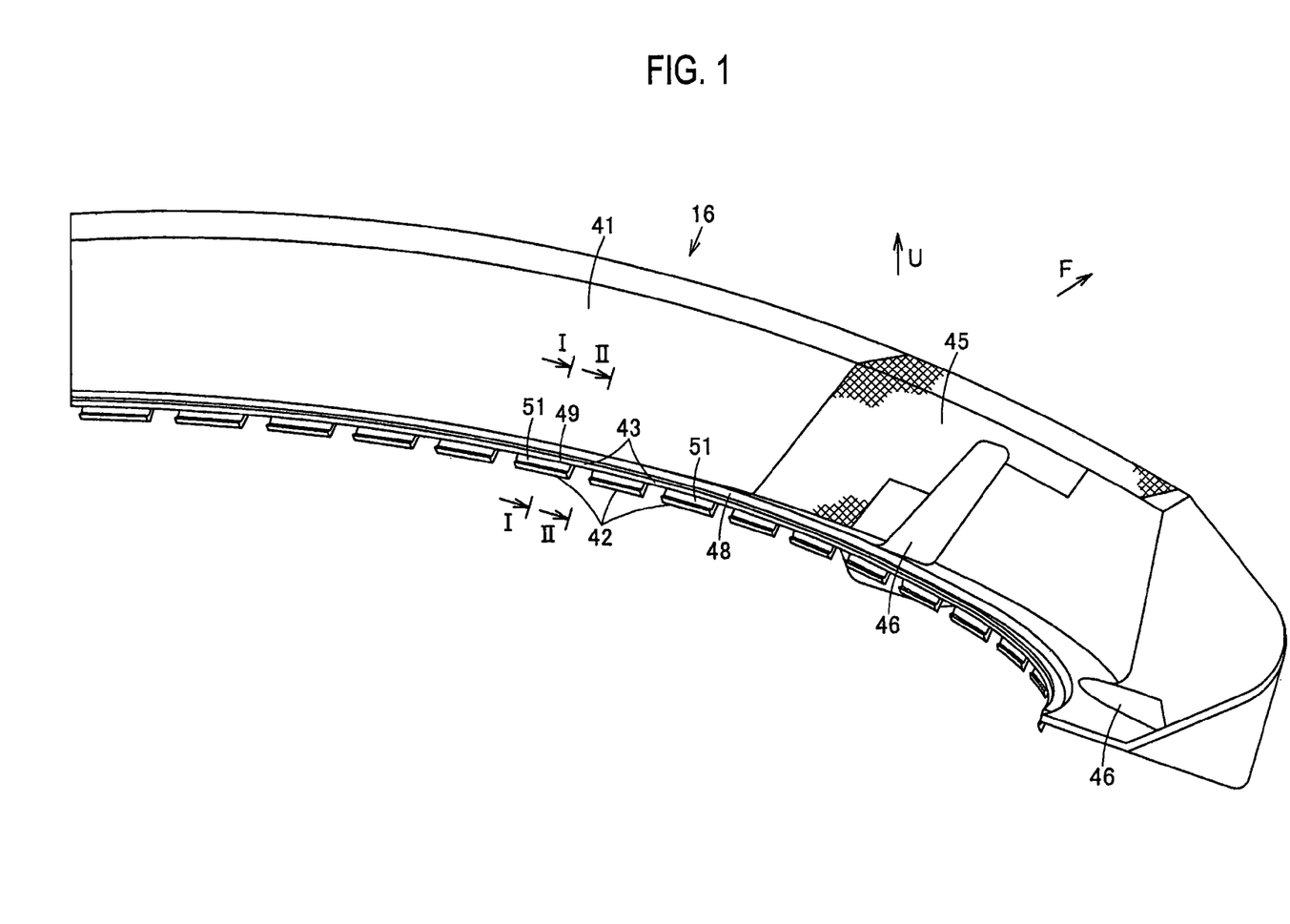
FIG. 1 is a perspective view showing a cowl cover of a cowl cover device according to a first embodiment of the present invention.
Figure 4:
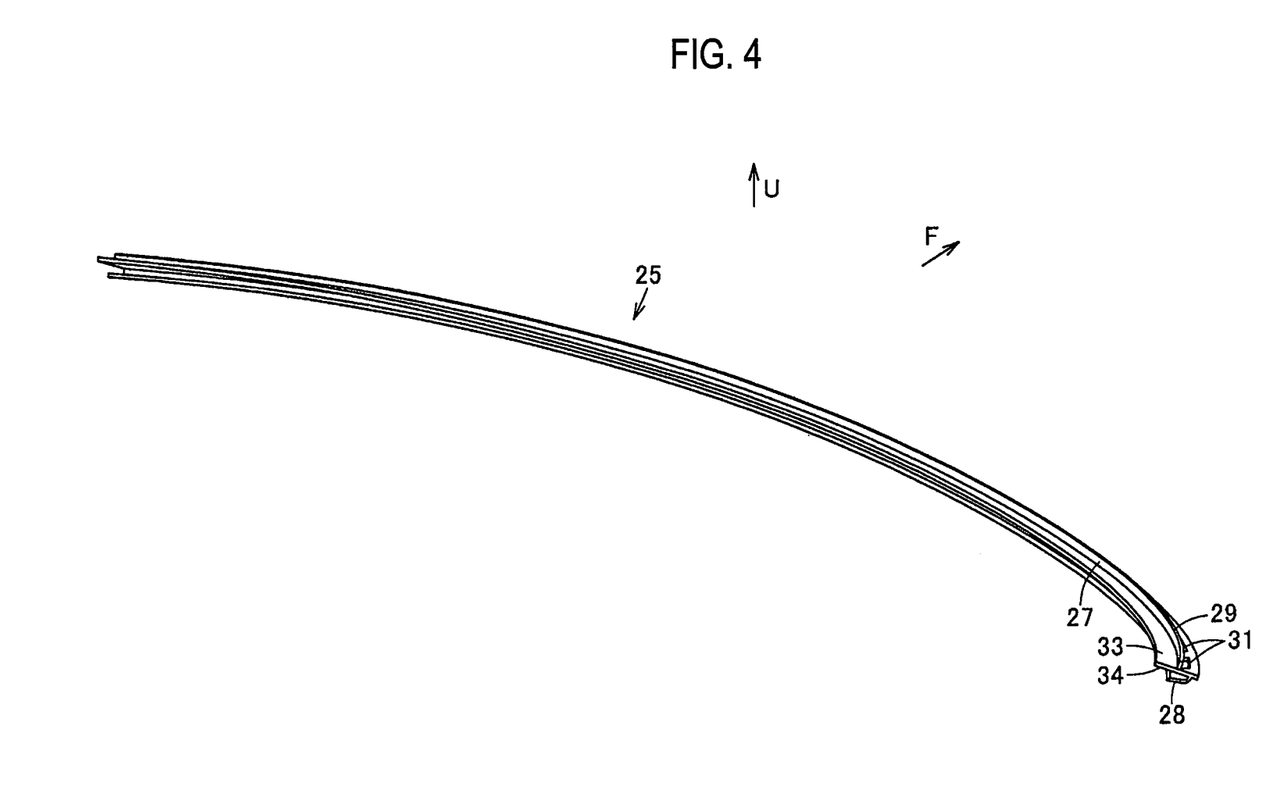
FIG. 4 is a perspective view of a receiving member of the cowl cover device according to the first embodiment.
Figure 5:
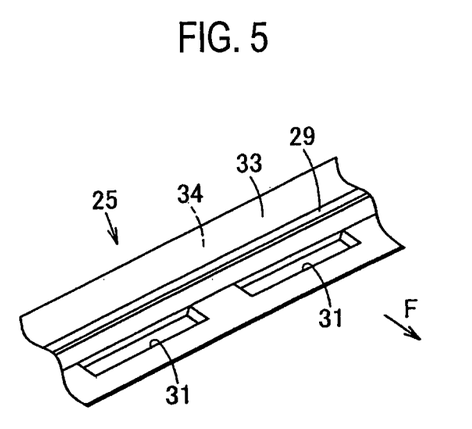
FIG. 5 is an enlarged perspective view of a part of the receiving member of the cowl cover device according to the first embodiment.
Figure 6:
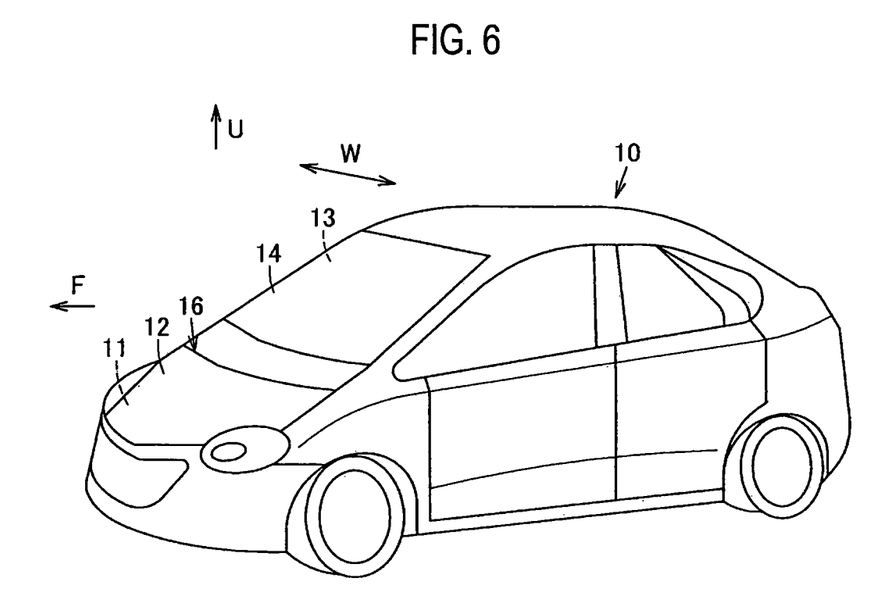
FIG. 6 is a perspective view showing a vehicle equipped with the cowl cover device according to the first embodiment.

An engagement member 25 as a receiving member is integrally attached to the entirety of a front edge of the front windshield 14. The engagement member 25 is also referred to as a holder. As shown in FIG. 1, FIG. 4, and FIG. 5, the engagement member 25 includes: an engagement member body 27 as a receiving member body molded by using a hard synthetic resin, for example; a gutter 28 provided in a protruding manner on a back face of the engagement member body 27, i.e., on the cowl top panel 22 side (the vehicle body 10 side); and an elastic portion 29 integrally provided on a surface of the engagement member body 27. The engagement member 25 is disposed to be inclined in accordance with an inclination of the front windshield 14 such that a front side of the engagement member 25 is located relatively on a lower side than a rear side thereof. The engagement member 25 and the cowl top cover 16 collectively constitute the cowl cover device 30.

The engagement member body 27 is a plate-like body which is formed into an elongated shape that is continuous in the vehicle width direction across the front edge of the front windshield 14. The engagement member body 27 is provided with multiple engagement receivers 31 as receivers arranged in the vehicle width direction, which are intermittently opened separately from one another and substantially at regular intervals at positions in front of the front edge of the front windshield 14. A holding projection 32 for holding the elastic portion 29 is provided in a protruding manner on a surface side of the engagement member body 27 at a position behind rear edges 31a each being an edge of each engagement receiver 31, or in other words, at a position adjacent to the front windshield 14. An attached portion 34, to which a portion in the vicinity of a front end part of the front windshield 14 is to be attached through the intermediary of a double-sided adhesive tape 33, is formed into a planar shape on the surface of the engagement member body 27 at a position behind the holding projection 32, or in other words, at a position adjacent to the front windshield 14.

The engagement receivers 31 are each formed into a rectangular hole elongated in the vehicle width direction, for example, and are arranged across the entire front edge of the front windshield 14. In other words, in each engagement receiver 31, its side in the right-left direction is longer than its side in the front-back direction.

The holding projection 32 is formed into a rib-like shape that continues in the vehicle width direction, for example.

Of the double-sided adhesive tape 33, one surface is attached in such a way as to cover substantially the entirety on the front face side of the attached portion 34, while the other surface is attached continuously to the entire front edge on a back face of the front windshield 14.

The gutter 28 defines a water passage in conjunction with the engagement member body 27, which is configured to guide water entering through the engagement receivers 31 to relatively lower positions such as two ends in the vehicle width direction. The gutter 28 is provided on the back face of the engagement member body 27 and in such a way as to protrude backward from front edges 31b each of which is the other edge of each engagement receiver 31. The gutter 28 is formed into an elongated shape that continues in the vehicle width direction and is opposed to the engagement receivers 31, and two ends of the gutter 28 extend to positions near two sides of the vehicle body 10. When viewed in section, a tip end of the gutter 28 is bent almost perpendicularly from the back face of the engagement member body 27 backward and upward, or in other words, toward the front windshield 14. Thus, the gutter 28 is formed into an L-shape. In a cross section taking in the front-back direction and in a cross section taking in a vertical direction, the front end portion of the gutter 28 in the form of a free end extends upward relative to a base end that continues from the engagement member body 27 and relative to the rear edges 31a of the engagement receivers 31. The gutter 28 can form the water passage at a predetermined level in a setting stage so as to be able to drain the water from the two sides of the vehicle body 10 to the outside of the vehicle by adjusting the level as long as a contact surface with the vehicle body 10 when attaching the engagement member 25 to the front windshield 14 is ascertained in advance.

The elastic portion 29 is also referred to as an end rubber and the like. The elastic portion 29 is made of an elastic soft synthetic resin like a thermoplastic elastomer such as TPO. The elastic portion 29 continues lengthwise across the two sides of the engagement member body 27 (the engagement member 25) by being held by the holding projection 32. The elastic portion 29 is elastically sandwiched between the front edge of the front windshield 14 and a rear edge of the cowl top cover 16, thereby filling a gap between the front edge of the front windshield 14 and the cowl top cover 16 (the cowl cover device 30).

Figure 2A:
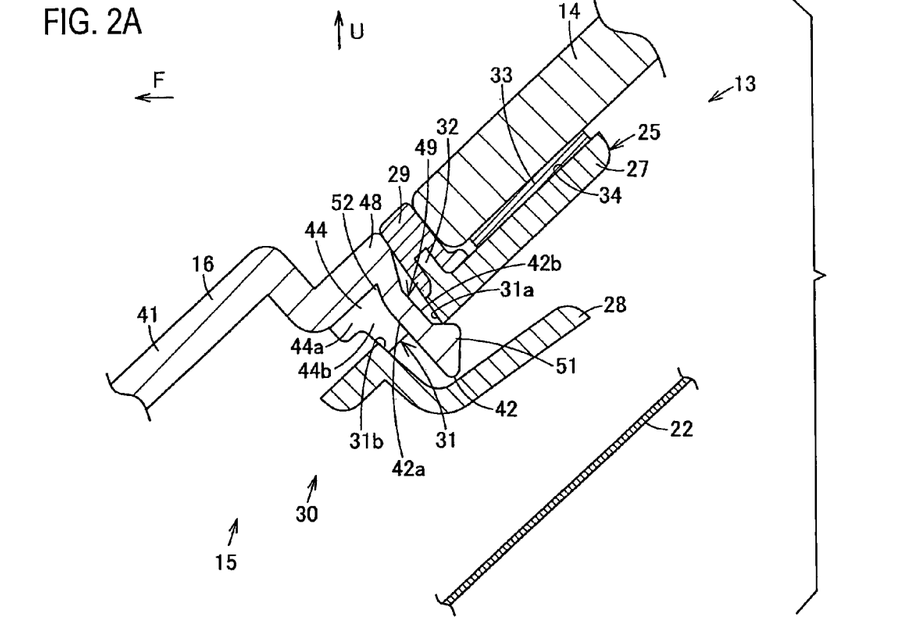
FIG. 2A is a cross-sectional view of the cowl cover device taken along the IIA-IIA line in FIG. 1.
Figure 2B:
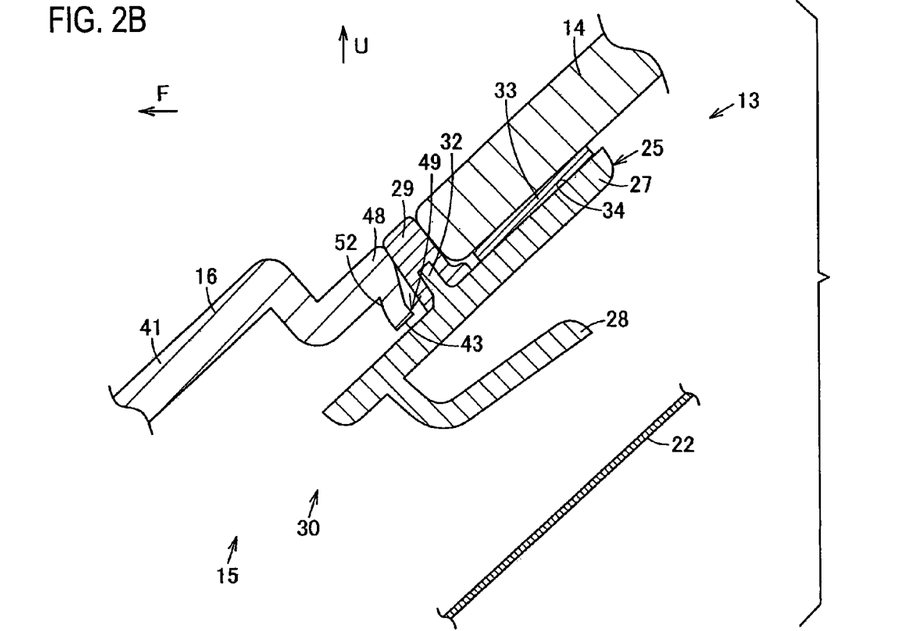
FIG. 2B is a cross-sectional view of the cowl cover device taken along the IIB-IIB line in FIG. 1.
Figure 3:
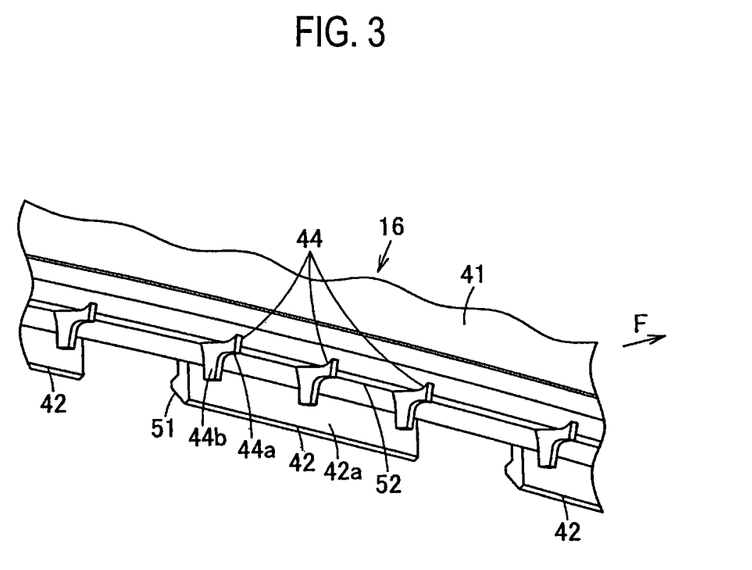
FIG. 3 is an enlarged perspective view of a back face of a locking claw of the cowl cover according to the first embodiment.

The cowl top cover 16 shown in FIG. 1 to FIG. 3 is made of a hard synthetic resin, for example, and is formed substantially into an elongated plate shape whose longitudinal direction is aligned with a direction connecting the two ends of the vehicle body 10 (FIG. 6) along the cowl part 15, or with the vehicle width direction in other words, so that the cowl top cover 16 can improve external appearance by covering an upper side of the cowl part 15, i.e., the cowl top panel 22.

The cowl top cover 16 includes: a cover body 41 in a plate shape which is disposed continuously to the front edge of the front windshield 14 with its longitudinal direction aligned with the vehicle width direction; multiple locking claws 42 provided in a protruding manner to the rear edge of the cover body 41 opposed to the front edge of the front windshield 14; multiple protrusions 43 which are non-claw parts provided in a protruding manner to the rear edge of the cover body 41 at positions between the locking claws 42; and multiple ribs 44 which are reinforcing parts serving as insertion portions provided to the respective locking claws 42. The cowl top cover 16 is designed to cover the cowl part 15 above the cowl top panel 22 at a position of the front edge of the front windshield 14, and to define a space in conjunction with the hood 12, i.e., a space between the engine room 11 and the cowl part 15.

The cover body 41 is adapted to an appropriate shape in accordance with the shapes of the engine room 11 and the hood 12, a layout of the wipers, and the like. In the first embodiment, the cover body 41 is basically disposed by being inclined forward and downward along the front windshield 14 while aligning its longitudinal direction with the vehicle width direction. An upper surface on a rear edge side of the cover body 41 is made substantially flush with the front windshield 14 in the state where the locking claws 42 are attached to the engagement receivers 31. The cover body 41 is provided with: a grid-like air inlet port 45 also referred to as a grid-like air intake, which can introduce outside air into the cowl part 15; and multiple, such as two wiper pivot holes 46 which are circular holes for allowing shafts of the wipers to penetrate therethrough. A pressure contact portion 48 to be brought into pressure contact with the elastic portion 29 is formed at the rear edge of the cover body 41. A recess 49 to recede from the elastic portion 29 is formed in a recessed manner below the pressure contact portion 48. A not-illustrated hood sealing to be brought into pressure contact with a lower surface of a rear part of the hood 12 is attached to the cover body 41. The hood sealing is configured to establish liquid-tight contact with the hood 12 in the closed state, and thereby to block hot air and odor emitted from the engine room 11.

The pressure contact portion 48 and the recess 49 are respectively provided at the rear edge of the cover body 41 and across the locking claws 42 and the protrusions 43, and extend continuously in the longitudinal direction of the cover body 41, i.e., in the vehicle width direction. The recess 49 is designed to form the base end of each locking claw 42 into a weak part on which a stress is to be concentrated. The recesses 49 are recessed forward from the positions of the base ends of the locking claws 42 and the protrusions 43 to tip end sides thereof.

The locking claws 42 are projections which are also referred to as windshield contact parts or windshield attachment parts. The locking claws 42 are inserted into and locked with the engagement receivers 31 while attaching the cowl top cover 16 to the engagement member 25. Each locking claw 42 is formed lengthwise along the vehicle width direction being the longitudinal direction of the cover body 41. These locking claws 42 protrude downward in a plate-like shape from a rear face (a lower surface) of the cover body 41. In each of the locking claws 42, a claw 51 to be locked with the rear edge 31a of the corresponding engagement receiver 31 is formed in such a manner as to bulge backward only at a tip end of one side surface (a first side surface) on the front windshield 14 side, namely, on a rear surface 42b. Moreover, the locking claws 42 are not provided with any protruding portions on other side surfaces (second side surfaces) on the opposite side of the front glass 14, namely, on front faces 42a. In other words, each of the locking claws 42 is formed into a so-called single-sided claw. On the front surfaces 42a of the respective locking claws 42, notches 52 that are recessed backward are provided in a recessed manner to the cover body 41 at positions corresponding to the base ends of the respective locking claws 42.

Each claw 51 is engaged with a lower part of the rear edge (a first edge) 31a of the corresponding engagement receiver 31. The claw 51 is formed into a triangular shape in a side view, which protrudes backward, i.e., toward the front windshield 14.

The notch 52 is designed to form the base end of each locking claw 42 into the weak part on which the stress is to be concentrated. In each of the locking claws 42 and the protrusions 43, the notch 52 is provided at a position on the opposite side from the recess 49 and in a recessed manner that is gradually recessed from its tip end side (a lower side) toward its base end side (an upper side) to form an acute angle. Accordingly, the base end side of each of the locking claws 42 and the protrusions 43 is tapered form its tip end side toward its base end side in the front-back direction by providing the notch 52 and the recess 49.

A lower end of each protrusion 43 is separated from and opposed to an upper surface of the engagement member body 27 of the engagement member 25 while attaching the cowl top cover 16 to the engagement member 25 (FIG. 2B).

The ribs 44 reinforce each locking claw 42. Each locking claw 42 is provided with three ribs 44, for example, which are arranged away from one another substantially at regular intervals in the vehicle width direction which is the longitudinal direction of the locking claw 42, for example. The ribs 44 are formed in the front-back direction and each have a thickness in the vehicle width direction. In other words, the ribs 44 protrude from the back face (the lower surface) of the cover body 41. In addition, each of these ribs 44 is formed substantially into an L-shape integrally provided with a lateral wall 44a connected to the front side surface 42a of the base end of the locking claw 42 along the back face of the cover body 41, and a vertical wall 44b as an inserted portion extending in the vertical direction along the front side surface 42a of the locking claw 42. In other words, each of the ribs 44 is continuously provided from the back face of the cover body 41 to the front side surface 42a of the locking claw 42. Each vertical wall 44b is inserted into an opposite side of the corresponding engagement receiver 31 from the claw 51 of the locking claw 42, i.e., the front side of the engagement receiver 31, and is located therein while coming into contact with the front edge (a second edge) 31b of the engagement receiver 31. The vertical wall 44b located in the engagement receiver 31 holds the locking claw 42 by applying pressure in such a direction (backward) to increase bite of the claw 51 on the rear edge 31a of the engagement receiver 31, thereby preventing the locking claw 42 from falling out.

When the cowl top cover 16 is attached to the vehicle body 10, the elastic portion 29 is first held on the holding projection 32 of the engagement member 25, and the double-sided adhesive tape 33 is attached to the attached portion 34 of the engagement member 25. In this state, the double-sided adhesive tape 33 is attached to a back face of the front edge of the front windshield 14. Thus, the engagement member 25 is fixed to the front windshield 14. Subsequently, the locking claws 42 of the cowl top cover 16 molded separately are placed adjacent to the engagement receivers 31 located on the front edge of the front windshield 14, and the cowl top cover 16 is pressed downward which is a predetermined direction. At this time, the recesses 49 allow the locking claws 42 and the protrusions 43 to move away from the elastic portion 29 which is elastically deformable, or in other words, provided with relatively large friction resistance. Thus, the area of sliding contact with the elastic portion 29 is reduced and sliding resistance is suppressed, whereby the cowl top cover 16 can be easily pushed in. As a consequence, the claws 51 are easily inserted into the engagement receivers 31 of the engagement member 25 and are engaged with the rear edges 31a, while the vertical walls 44b of the ribs 44 are inserted to the front edge 31b side of the engagement receivers 31 and come into contact with the front edges 31b. The cowl top cover 16 is pushed in until each of the claws 51 of the locking claws 42 is located at the lower part of the rear edge 31a of the corresponding engagement receiver 31. In this state, the elastic portion 29 is sandwiched in the front-back direction between the front edge of the front windshield 14 and the pressure contact portion 48 of the cowl top cover 16. Then, in the closed state of the hood 12, the hood sealing is deformed and comes into close contact with the hood 12, thereby shielding hot air and odor emitted from the engine room 11 so as not to be taken into to the vehicle cabin 13 through the air inlet port 45.

When a load (an external force) is applied from above to the cowl top cover 16 due to a collision of an obstacle or the like, tip ends (lower ends) of the locking claws 42 come into contact with the gutter 28 whereby the stress is concentrated on the positions of the recesses 49 and the notches 52 thereof, and the locking claws 42 are folded (bent) from the base ends starting from the recesses 49 and the notches 52. Thus, the load is absorbed by releasing the cowl top cover 16, and an injury value is thereby suppressed.

According to the first embodiment, the claws 51 are provided on the rear surfaces 42b of the locking claws 42 provided in a protruding manner on the back face side of the cover body 41 of the cowl top cover 16. For this reason, it is possible to reduce restrictions on the design of the cowl top cover 16 while simplifying the form of the locking claws 42 into the single-claw shape. Moreover, the vertical walls 44b of the ribs 44 provided on the front faces 42a of the locking claws 42 and along the locking claws 42 can be brought into contact with the front edges 31b of the engagement receivers 31. Thus, it is possible to retain a state of securely engaging the claws 51 of the locking claws 42 with the rear edges 31a of the engagement receivers 31. This makes it possible to prevent backlashes between the locking claws 42 and the engagement receivers 31, to stably lock the cowl top cover 16 with the engagement member 25, and to maintain a stable state after attaching the cowl top cover 16.

Furthermore, each locking claw 42 is formed into the single-claw shape and the ribs 44 are formed in the vertical direction along each locking claw 42. For this reason, it is possible to form a mold for forming the locking claws 42 and the ribs 44 (the cowl top cover 16) into a simple mold structure without using slide cores or the like, and thereby to reduce a manufacturing cost.

In addition, the vertical walls 44b of the ribs 44 are not engaged with the engagement receivers 31. Accordingly, the locking claws 42 and the vertical walls 44b can be easily inserted into the engagement receivers 31 and the cowl top cover 16 can be easily attached to the engagement member 25. In other words, the cowl top cover 16 involves easy attachment work to the engagement member 25 and yet enables secure and stable fixation to the engagement member 25.

Meanwhile, the elastic deformation of the elastic portion 29 makes it possible to effectively fill the gap between the front edge of the front windshield 14 and the cowl top cover 16. Moreover, the recesses 49 make it possible to suppress sliding resistance between the cowl top cover 16 and the elastic portion 29 when the locking claws 42 are inserted into the engagement receivers 31. Thus, it is possible to insert the locking claws 42 into the engagement receivers 31 more easily, and to further facilitate the attachment work of the cowl top cover 16.

In addition, the base ends of the locking claws 42 are formed into the weak parts by providing the notches 52. Accordingly, when the load is applied to the cowl top cover 16, the locking claws 42 are allowed to be folded at the base ends and are thus capable of reliably absorbing the load. Furthermore, in each locking claw 42, the notch 52 is formed on the opposite side from the recess 49. For this reason, the notches 52 and the recesses 49 can reliably form the base ends of the respective locking claws 42 into the weak parts, thereby allowing the fold at the base ends of the locking claws 42 more reliably when the load is applied to the cowl top cover 16.

In the meantime, the water that breaks in from a joint between the front windshield 14 and the cowl top cover 16 through the engagement receivers 31 is guided in the vehicle width direction by way of the gutter 28. Accordingly, the water can be drained from the two sides of the vehicle body 10 to the outside of the vehicle, for example, and can be more reliably inhibited from entering undesired parts such as the cowl part 15. Furthermore, the lowermost surface of the gutter 28 can be freely set depending on the shape of the vehicle body 10 and the like. Accordingly, the gutter 28 can be adjusted at a stage prior to forming the engagement member 25. In other words, the cowl cover device 30 can form the water passage by using the gutter 28 having the high design freedom, and can therefore be adapted to settings with the high design freedom. Furthermore, when the load is applied to the cowl top cover 16, the tip ends of the locking claws 42 come into contact with the gutter 28. Accordingly, the stress is more likely to be concentrated on the base ends (the notches 52 and the recesses 49) of the locking claws 42, so that the locking claws 42 can be folded more easily at the base ends, thereby absorbing the load more reliably.

According to the first embodiment, it is possible to provide the balanced cowl cover device 30, which can achieve easy and secure lock of the cowl top cover 16 with the engagement member 25, and pedestrian protection at the same time.

Figure 7:
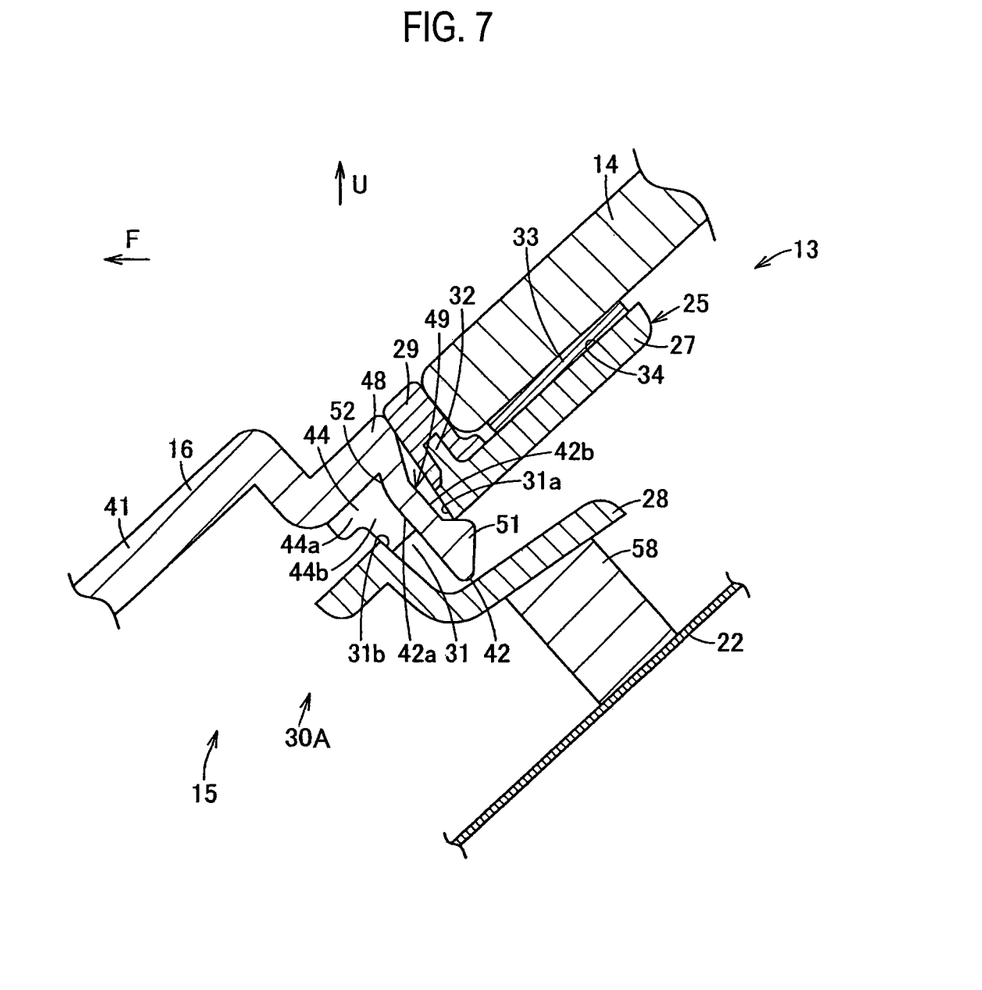
FIG. 7 is a cross-sectional view of a cowl cover device according to a second embodiment of the present invention.

Next, a cowl cover device 30A according to a second embodiment shown in FIG. 7 will be described. The cowl cover device 30A includes a sealing member 58 located between the gutter 28 and the cowl top panel 22 of the first embodiment, and designed to fill the gap between the gutter 28 and the cowl top panel 22. Other features of the cowl cover device 30A are the same as those of the first embodiment. A longitudinal direction of the sealing member 58 is aligned with the vehicle width direction, and the sealing member 58 is continuously provided across the entirely in the vehicle width direction. The sealing member 58 fills the gap between the gutter 28 and the cowl top panel 22. Accordingly, even if the water leaks out of the gutter 28, the sealing member 58 can prevent the water from entering the cowl part 15. Thus, it is possible to more reliably inhibit the water from entering undesired parts.

Note that in the first and second embodiment, the notches 52 do not always have to be formed at the protrusions 43 between the locking claws 42 as long as the notches 52 are at least located at the base ends of the locking claw 42.

Meanwhile, the elastic portion 29 may be manufactured together with the engagement member 25 by two-color molding, and is adaptable to various specifications.

Furthermore, the cowl top cover 16 may also be provided at a portion other than the front part of the vehicle body 10, and disposed to cover a cowl part between a rear windshield as another windshield and a trunk hood as a companion member of the rear windshield.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

The invention claimed is:

1. A cowl cover device comprising:
   a cowl cover comprising
      a cover body covering a cowl part between a windshield and a vehicle body member,
      a locking claw protruding from a back face side of the cover body and having a claw on a first side surface of the locking claw, and
      an insertion portion provided along the locking claw on a second surface of the locking claw opposite from the first side surface; and
   an engagement member attached to an edge of the windshield and having an engagement receiver for the locking claw and a part of the insertion portion to be inserted, wherein the engagement receiver comprises
      a first edge to be engaged with the claw of the locking claw inserted into the engagement receiver, and
      a second edge facing the first edge and to be in contact with the part of the insertion portion inserted into the engagement receiver,
   the engagement member comprises an elastically deformable elastic portion sandwiched between the edge of the windshield and the cowl cover, and
   the cowl cover comprises a recess located at a position opposed to the edge of the windshield and spacing the elastic portion from the locking claw inserted into the engagement receiver.

2. The cowl cover device according to claim 1, wherein the cowl cover comprises a notch provided to the cover body at least at a base end of the locking claw.

3. The cowl cover device according to claim 1, wherein the engagement member comprises a gutter protruding from a back face side of the engagement receiver and guiding water entering through the engagement receiver in a vehicle width direction.

4. The cowl cover device according to claim 3, further comprising a sealing member filling a gap between the gutter and the vehicle body member.

* * * * *